United States Patent
Green et al.

(10) Patent No.: US 6,490,606 B1
(45) Date of Patent: Dec. 3, 2002

(54) ROUNDING DENORMALIZED NUMBERS IN A PIPELINED FLOATING POINT UNIT WITHOUT PIPELINE STALLS

(75) Inventors: Daniel W. Green, McKinney, TX (US); Atul Dhablania, San Jose, CA (US)

(73) Assignee: National Semicondcutor Corporation, Santa Clara, CA (US)

(*) Notice: Subject to any disclaimer, the term of this patent is extended or adjusted under 35 U.S.C. 154(b) by 0 days.

(21) Appl. No.: 09/377,683

(22) Filed: Aug. 19, 1999

(51) Int. Cl.⁷ .............................................. G06F 7/38
(52) U.S. Cl. ..................... 708/497; 708/499
(58) Field of Search ............... 708/497, 499, 708/551, 205

(56) References Cited

U.S. PATENT DOCUMENTS

| | | | | |
|---|---|---|---|---|
| 4,949,291 A | | 8/1990 | Saini .......................... 364/715 |
| 5,040,138 A | | 8/1991 | Maher, III .................. 364/748 |
| 5,144,570 A | | 9/1992 | Maher, III .................. 364/715 |
| 5,161,117 A | | 11/1992 | Waggener, Jr. .............. 364/715 |
| 5,257,215 A | | 10/1993 | Poon .......................... 364/745 |
| 5,272,654 A | | 12/1993 | Nix ............................ 364/715 |
| 5,561,615 A | | 10/1996 | Kuo et al. ................... 364/715 |
| 5,584,009 A | | 12/1996 | Garibay, Jr. et al. ........ 395/444 |
| 5,619,198 A | | 4/1997 | Blackham et al. ............ 341/50 |
| 5,633,819 A | | 5/1997 | Brashears et al. .......... 364/748 |
| 5,644,741 A | | 7/1997 | Bluhm et al. ................ 395/376 |
| 5,646,875 A | * | 7/1997 | Taborn et al. ............... 708/205 |
| 5,652,584 A | | 7/1997 | Yoon ........................... 341/89 |
| 5,757,682 A | * | 5/1998 | Schwarz et al. ............. 708/499 |
| 5,835,967 A | | 11/1998 | McMahan .................... 711/213 |
| 5,886,915 A | * | 3/1999 | Sharangpani et al. ........ 708/497 |
| 5,903,479 A | * | 5/1999 | Schwarz et al. ............. 708/205 |
| 5,917,741 A | * | 6/1999 | Ng .............................. 708/497 |
| 6,219,684 B1 | * | 4/2001 | Saxena et al. ............... 708/497 |

OTHER PUBLICATIONS

*Leading–Zero Anticipatory Logic for High–Speed Floating Point Addition*, by Hiroaki Suzuki, Hiroyuki Morinaka, Hiroshi Makino, Yashunobu Nakase, Koichiro Mashiko, Member IEEE, and Tadashi Sumi, IEEE Journal of Solid–State Circuits, vol. 31, No. 8, Aug. 1996.

Hokenek and Montoye in "Leading–zero Anticipator (LZA) in the IBM RISC System/6000 Floating–point Execution Unit", IBM J. Res. Develop., vol. 34, No. 1, Jan. 1990.

* cited by examiner

*Primary Examiner*—David H. Malzahn
(74) *Attorney, Agent, or Firm*—John L. Maxin

(57) ABSTRACT

For use in a processor having a floating point unit (FPU) capable of managing denormalized numbers in floating point notation, logic circuitry for, and a method of, generating least significant (L), round (R) and sticky (S) bits for a denormalized number. In one embodiment, the system includes: (1) a bit mask decoder that produces a bit mask that is a function of a precision of the denormalized number and an extent to which the denormalized number is denormal and (2) combinatorial logic, coupled to the bit mask decoder, that performs logical operations with respect to a fraction portion of the denormalized number, the bit mask and at least one shifted version of the bit mask to yield the L, R and S bits.

20 Claims, 8 Drawing Sheets

| Step | Operation | Value |
|---|---|---|
| 1 | Input Operand | 1.000 0001 0010 0011 0100 0101 0110 0111 1000 1001 1010 1011 1100 1101 1110 1111 0000 11 |
| 2 | Single Precision Mask | 1.111 1111 1111 1111 1111 1111 1110 0000 0000 0000 0000 0000 0000 0000 0000 0000 0000 00 |
| 3 | Mask Complemented (~Mask) | 0.000 0000 0000 0000 0000 0000 0001 1111 1111 1111 1111 1111 1111 1111 1111 1111 1111 11 |
| 4 | Mask & Operand (1 & 2) | 1.000 0001 0010 0011 0100 0101 0110 0000 0000 0000 0000 0000 0000 0000 0000 0000 0000 00 |
| 5 | ~Mask \| Operand | 1.000 0001 0010 0011 0100 0101 0110 0111 1111 1111 1111 1111 1111 1111 1111 1111 1111 11 |
| 6 | (~Mask \| Operand) + 1ulp | 1.000 0001 0010 0011 0100 0110 0000 0000 0000 0000 0000 0000 0000 0000 0000 0000 0000 00 |
| 7 | ~Mask$_{-1}$ & Operand | 0.000 0000 0000 0000 0000 0000 0110 0111 1000 1001 1010 1011 1100 1101 1110 1111 0000 11 |
| 8 | ~Mask & Mask$_{-1}$ | 0.000 0000 0000 0000 0000 0000 0001 0000 0000 0000 0000 0000 0000 0000 0000 0000 0000 00 |
| 9 | ~Mask & Mask$_{-1}$ & Operand | 0.000 0000 0000 0000 0000 0000 0001 0000 0000 0000 0000 0000 0000 0000 0000 0000 0000 00 |
| 10 | ~Mask$_{+1}$ & Mask | 0.000 0000 0000 0000 0000 0000 0000 0000 0000 0000 0000 0000 0000 0000 0000 0000 0000 00 |
| 11 | ~Mask$_{+1}$ & Mask & Operand | 0.000 0000 0000 0000 0000 0000 0000 0000 0000 0000 0000 0000 0000 0000 0000 0000 0000 00 |

Notes:
(1) Mask$_{-1}$ = Mask >> 1 (i.e., Mask right-shifted by one bit)
(2) Mask$_{+1}$ = Mask << 1 (i.e., Mask left-shifted by one bit)

FIG. 8

ROUNDING DENORMALIZED NUMBERS IN A PIPELINED FLOATING POINT UNIT WITHOUT PIPELINE STALLS

This patent application is related to commonly assigned and contemporaneously filed U.S. patent applications Ser. No. 09/377,140 entitled "FORMATTING DENORMAL NUMBERS FOR PROCESSING IN A PIPELINED FLOATING POINT UNIT"; Ser. No. 09/377,099 entitled "CONVERTING NEGATIVE FLOATING POINT NUMBERS TO INTEGER NOTATION WITHOUT TWO'S COMPLEMENT HARDWARE"; Ser. No. 09/377,136 entitled "INTEGER TO FLOATING POINT CONVERSION USING ONE'S COMPLEMENT WITH SUBSEQUENT CORRECTION TO ELIMINATE TWO'S COMPLEMENT IN CRITICAL PATH"; and Ser. No. 09/377,139 entitled "LEADING BIT PREDICTION WITH IN-PARALLEL CORRECTION", all of which are herein incorporated by reference.

TECHNICAL FIELD OF THE INVENTION

The present invention is directed, in general, to processors and, more particularly, to rounding denormalized numbers in a pipelined floating point unit (FPU) without pipeline stalls.

BACKGROUND OF THE INVENTION

The ever-growing requirement for high performance computers demands that computer hardware architectures maximize software performance. Conventional computer architectures are made up of three primary components: (1) a processor, (2) a system memory and (3) one or more input/output devices. The processor controls the system memory and the input/output ("I/O") devices. The system memory stores not only data, but also instructions that the processor is capable of retrieving and executing to cause the computer to perform one or more desired processes or functions. The I/O devices are operative to interact with a user through a graphical user interface ("GUI") (such as provided by Microsoft Windows™ or IBM OS/2™), a network portal device, a printer, a mouse or other conventional device for facilitating interaction between the user and the computer.

Over the years, the quest for ever-increasing processing speeds has followed different directions. One approach to improve computer performance is to increase the rate of the clock that drives the processor. As the clock rate increases, however, the processor's power consumption and temperature also increase. Increased power consumption is expensive and high circuit temperatures may damage the processor. Further, the processor clock rate may not increase beyond a threshold physical speed at which signals may traverse the processor. Simply stated, there is a practical maximum to the clock rate that is acceptable to conventional processors.

An alternate approach to improve computer performance is to increase the number of instructions executed per clock cycle by the processor ("processor throughput"). One technique for increasing processor throughput is pipelining, which calls for the processor to be divided into separate processing stages (collectively termed a "pipeline"). Instructions are processed in an "assembly line" fashion in the processing stages. Each processing stage is optimized to perform a particular processing function, thereby causing the processor as a whole to become faster.

"Superpipelining" extends the pipelining concept further by allowing the simultaneous processing of multiple instructions in the pipeline. Consider, as an example, a processor in which each instruction executes in six stages, each stage requiring a single clock cycle to perform its function. Six separate instructions can therefore be processed concurrently in the pipeline; i.e., the processing of one instruction is completed during each clock cycle. The instruction throughput of an n-stage pipelined architecture is therefore, in theory, n times greater than the throughput of a non-pipelined architecture capable of completing only one instruction every n clock cycles.

Another technique for increasing overall processor speed is "superscalar" processing. Superscalar processing calls for multiple instructions to be processed per clock cycle. Assuming that instructions are independent of one another (the execution of each instruction does not depend upon the execution of any other instruction), processor throughput is increased in proportion to the number of instructions processed per clock cycle ("degree of scalability"). If, for example, a particular processor architecture is superscalar to degree three (i.e., three instructions are processed during each clock cycle), the instruction throughput of the processor is theoretically tripled.

These techniques are not mutually exclusive; processors may be both superpipelined and superscalar. However, operation of such processors in practice is often far from ideal, as instructions tend to depend upon one another and are also often not executed efficiently within the pipeline stages. In actual operation, instructions often require varying amounts of processor resources, creating interruptions ("bubbles" or "stalls") in the flow of instructions through the pipeline. Consequently, while superpipelining and superscalar techniques do increase throughput, the actual throughput of the processor ultimately depends upon the particular instructions processed during a given period of time and the particular implementation of the processor's architecture.

The speed at which a processor can perform a desired task is also a function of the number of instructions required to code the task. A processor may require one or many clock cycles to execute a particular instruction. Thus, in order to enhance the speed at which a processor can perform a desired task, both the number of instructions used to code the task as well as the number of clock cycles required to execute each instruction should be minimized.

Statistically, certain instructions are executed more frequently than others are. If the design of a processor is optimized to rapidly process the instructions which occur most frequently, then the overall throughput of the processor can be increased. Unfortunately, the optimization of a processor for certain frequent instructions is usually obtained only at the expense of other less frequent instructions, or requires additional circuitry, which increases the size of the processor.

As computer programs have become increasingly more graphic-oriented, processors have had to deal more and more with the operations on numbers in floating point notation. Thus, to enhance the throughput of a processor that must generate, for example, data necessary to represent graphical images, it is desirable to optimize the processor to efficiently process numbers in floating point notation.

One aspect of operations involving numbers in floating point notation is "rounding", which is basically the increasing or decreasing of the least significant bit of a floating point operand to conform the operand to a desired degree of precision; the IEEE Standard 754 defines the formats for various levels of precision. In an FPU, rounding operations may be required in combination with a floating-point adder unit ("FAU"), a floating-point multiplication unit ("FMU"), and a store unit. To simplify the design and fabrication of the FPU, it is desirable to employ a rounding unit that is "modularized", i.e., which can be universally employed, without modification, in combination with a FAU, FMU, or floating-point store unit.

Implementation of the IEEE 754 standard for rounding has always posed a challenge for FPU designers. The rounding process is complicated by the fact that the Intel x87 architecture supports denormal numbers and gradual underflow. Rounding for numbers in the subnormal range is a function of the method by which the numbers are stored in the machine; storing denormal numbers in the normal format helps to eliminate a normalization step that would otherwise be required when such numbers are operated upon, but poses a problem in the rounding step due to the variable location of the decimal point.

Therefore, what is needed in the art is a system and method for rounding denormalized numbers and a processor employing the same. Preferably, the system or method is embodied in a modular circuit that is suitably operative in combination with a FAU, a FMU, and a floating-point store unit.

SUMMARY OF THE INVENTION

To address the above-discussed deficiencies of the prior art, it is a primary object of the present invention to provide rounding logic capable of handling denormalized numbers and a processor employing the same.

In the attainment of the above primary object, the present invention provides, for use in a processor having a floating point unit (FPU) capable of managing denormalized numbers in floating point notation, logic circuitry for, and a method of, generating least significant (L), round (R) and sticky (S) bits for a denormalized number. In one embodiment, the system includes: (1) a bit mask decoder that produces a bit mask that is a function of a precision of the denormalized number and an extent to which the denormalized number is denormal and (2) combinatorial logic, coupled to the bit mask decoder, that performs logical operations with respect to a fraction portion of the denormalized number, the bit mask and at least one shifted version of the bit mask to yield the L, R and S bits.

The present invention therefore introduces the broad concept of rounding logic capable of dealing with denormalized numbers. This can be accomplished by creating a mask that takes into account each number's denormalization and employs the mask in logical operations to determine the L, R and S bits necessary to determine rounding.

The present invention can preferably be embodied as a pipelined process, resulting in relatively fast operation. Further, an embodiment to be illustrated and described contains logic sufficient to render a rounder that may be generically employed with an adder, a multiplier or a load unit. In this sense, the present invention can provide a modular, "universal" rounder, perhaps for use in multiple locations in a single processor.

For purposes of the present invention, "an extent to which the denormalized number is denormal" is defined as the degree to which (or, synonymously, quantity of bits by which) the denormalized number is misaligned. In one embodiment of the present invention, the extent may be determined with reference to the denormalized number's exponent. Knowing the extent of denormalization allows an appropriate bit mask to be created that defines the dividing line between (1) the fraction portion of the denormalized number and (2) bits that are too insignificant to be contained in the fraction portion. While the latter bits fall outside of the fraction portion, they nonetheless play a significant role in rounding according to the IEEE 754 standard, as will be set forth in detail below.

In one embodiment of the present invention, the combinatorial logic generates the L bit by: (1) initially bitwise ANDing the bit mask and an inverted, 1-bit left-shifted version of the bit mask to yield a first intermediate bit pattern, (2) next bitwise ANDing the fraction portion and the first intermediate bit pattern to yield a second intermediate bit pattern and (3) next ORing bits in the second intermediate bit pattern to yield the L bit.

In one embodiment of the present invention, the combinatorial logic generates the R bit by: (1) initially bitwise ANDing an inverted version of the bit mask and a 1-bit right-shifted version of the bit mask to yield a first intermediate bit pattern, (2) next bitwise ANDing the fraction portion and the first intermediate bit pattern to yield a second intermediate bit pattern and (3) next ORing bits in the second intermediate bit pattern to yield the R bit.

In one embodiment of the present invention, the combinatorial logic generates the S bit by: (1) initially bitwise ANDing the fraction portion and an inverted, 1-bit right-shifted version of the bit mask to yield an intermediate bit pattern and (2) next ORing bits in the intermediate bit pattern to yield the S bit.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which:

FIG. 8 illustrates how a transcendental precision mantissa, with 70 bits of precision, is rounded to 23 bits for a single precision number;

DETAILED DESCRIPTION

Figure 1A:
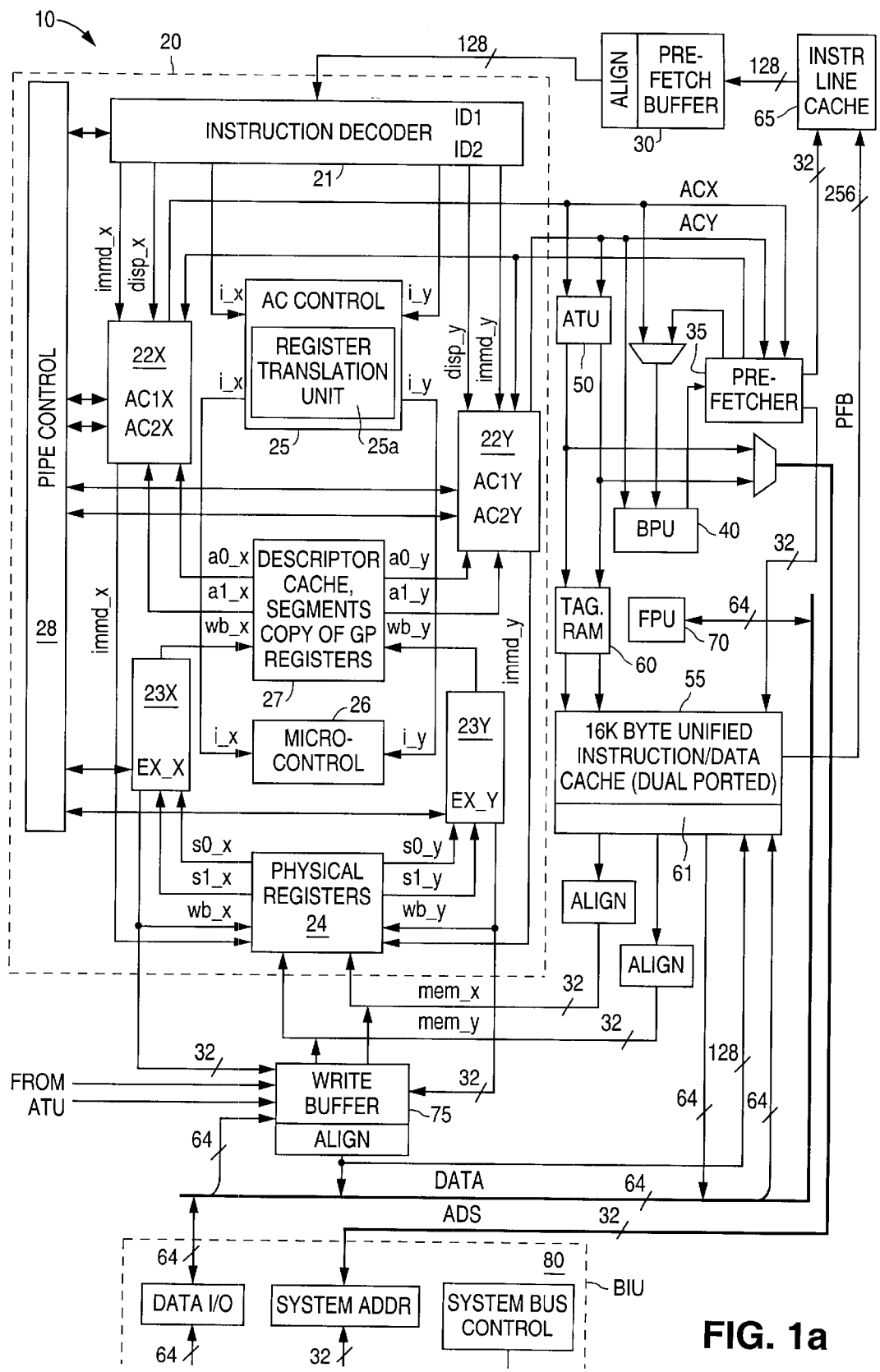
FIG. 1a illustrates a block diagram of an exemplary superscalar and superpipelined processor in accordance with the principles of the present invention.

Referring initially to FIG. 1a, illustrated is a block diagram of an exemplary superscalar and superpipelined processor 10 in accordance with the principles of the present invention. Exemplary processor 10 includes a processor core 20, a prefetch buffer 30, a prefetcher 35, a branch processing unit ("BPU") 40, an address translation unit ("ATU") 50, a unified cache 55, TAG random access memory ("TAG RAM") 60, an instruction line cache 65, an onboard floating point unit ("FPU") 70, a plurality of write buffers 75 (one shown), and a bus interface unit ("BIU") 80. Each of the above-identified components is conventional, i.e., their functionality is known. The functionality associated with the interrelationship of various ones of the components is also known. Exemplary processors implementing the foregoing are the 6x86 and MII processors available from Cyrix Corporation of Richardson, Tex.

In an exemplary embodiment, instruction line cache 65 and unified cache 55 operate as primary and secondary instruction caches, respectively, each having a 32 byte line size. This implementation reduces instruction fetches to unified cache 55. In a preferred embodiment, instruction line cache 65 may be a 256 byte cache, while unified cache 55 maybe a 16 kilobyte ("Kbyte") code/data cache. Unified cache 55 may also be associated with TAG RAM 60. In another exemplary embodiment, processor 10 may use a 32-bit address bus ("ADS"), a 64-bit data bus ("DATA") and a 256 bit pre-fetch bus ("PFB"). The PFB corresponds to the 32 byte line sizes of unified cache 55 and instruction line cache 65, and enables a full line of 32 instruction bytes to be transferred to instruction line cache 65 in a single clock cycle.

Unified cache 55 is preferably 4-way set associative, using a pseudo-least-recently-used ("LRU") replacement algorithm, with selectively alternative write-through and write-back modes. Unified cache 55 is multi-ported (through banking) to permit two memory accesses (e.g., data reads, instruction fetches or data writes) per clock cycle. Instruction-line cache 65 is preferably a fully associative, look-aside implementation (relative to the unified cache 55), using an LRU replacement algorithm.

Turning momentarily to exemplary processor core 20, illustrated is a superscalar and superpipelined design having two exemplary execution pipelines, designated X and Y, and including an instruction decode ("ID") stage 21, two address calculation/operand access ("AC") stages, 22X and 22Y, two execution ("EX") stages, 23X and 23Y, and a register file 24 having 31 32-bit registers. Core 20 further includes an AC control stage 25, a microcontrol unit 26, a pipe control unit 28, and a second register file 27 containing a descriptor cache, segment registers and a copy of the logical general purpose registers.

Exemplary ID stage 21 is operative to decode a variable length x86-based instruction set, and may retrieve 16 bytes of instruction data from pre-fetch buffer 30 each clock cycle. Exemplary AC stages 22X and 22Y are each operative to perform address calculations for their respective execution pipelines. Exemplary EX stages 23X and 23Y are each operative to execute instructions within their respective execution pipelines. Exemplary register file 24 includes 31 physical registers. Exemplary AC control stage 25, which includes a register translation unit 25a, and may further include appropriately arranged register renaming hardware (not shown), is operative to control address calculations. Exemplary microcontrol unit 26, which may include a micro-sequencer (not shown) and a micro-ROM (not shown), provides execution control. Again, exemplary second register file 27 may include a descriptor cache, segment registers and a copy of the logical general purpose registers (i.e., as obtained from register file 24). Exemplary pipe control unit 28 is operative to control instruction flow through exemplary execution pipelines X and Y, whereby instruction order is maintained until pipe control unit 28 determines that a particular instruction will not cause an exception.

In an exemplary embodiment, register translation unit 25a has a capacity to map 32 physical registers to 8 logical registers. In the illustrated embodiment however, processor 10 includes only 31 physical registers, leaving register translation unit 25a with excess mapping capacity. Processor 10 may use the excess mapping capacity by allowing register translation unit 25a to map to a physical register other than those located in register file 24. In the illustrated embodiment, the physical register may be located in second register file 27, which is under control of AC control unit 25. In an alternate exemplary embodiment, pipe control unit 28 is further operative to remove bubbles from the instruction stream, i.e., "flushing" the execution pipelines behind branches that are mis-predicted and handling the execution of exception-causing instructions.

More particularly, BPU 40 monitors speculative execution associated with branches or floating point instructions (i.e., execution of instructions speculatively issued after branches that may be mis-predicted or floating point instructions issued to FPU 70 that may fault after execution of speculatively-issued instructions). In the event that a branch is mis-predicted (a condition not known until the instruction reaches one of the execution or write-back stages for the branch) or a floating point instruction faults, the execution pipeline is repaired to the point of the mis-predicted or faulting instruction (i.e., the execution pipeline is "flushed" behind the instruction) and an associated instruction fetch is restarted. Pipeline repair is preferably accomplished by creating processor state checkpoints at each pipeline stage as a predicted branch or floating point instruction enters the same. For these check pointed instructions, all processor resources (e.g., programmer-visible registers, the instruction pointer and the condition code register) that may be modified by succeeding speculatively-issued instructions are check pointed. If a check pointed branch is mis-predicted or a check pointed floating point instruction faults, the execution pipeline is flushed behind the check pointed instruction. In the case of floating point instructions, this typically results in the entire execution pipeline being flushed. However, for a mis-predicted branch, there may be a paired instruction in EX and two instructions in WB that are nonetheless allowed to complete.

In accordance with the illustrated embodiment, writes from processor core 20 may be queued into write buffer 75. Write buffer 75 provides an interface for writes to unified cache 55, while non-cacheable writes proceed directly from write buffer 75 to an external memory (shown and described in conjunction with FIG. 2). Write buffer logic may support optional read sourcing and write gathering. In an exemplary embodiment, write buffer 75 includes twelve 32-bit write buffers, and write buffer allocation is performed by AC control unit 25.

FPU 70 includes a load/store stage with 4-deep load and store queues, a conversion stage (32-bit to 80-bit extended format), and an execution stage. Loads are controlled by processor core 20, and cacheable stores are directed through write buffer 75 (i.e., write buffer 75 is preferably allocated for each floating point store operation).

Figure 1B:
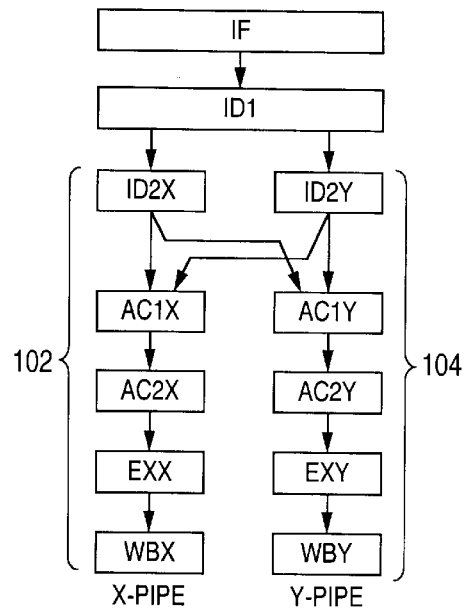
FIG. 1b illustrates a block diagram of seven exemplary pipelined stages of the processor of FIG. 1a, including X and Y execution pipelines.

Turning to FIG. 1b, illustrated is a block diagram of seven exemplary pipelined stages of processor 10 of FIG. 1a, including X and Y execution pipelines. As before, each of the X and Y execution pipelines includes IF, ID1, ID2, AC1, AC2, EX and WB stages. Exemplary IF stage provides a continuous instruction code stream into processor core 20. Prefetcher 35 is operative to fetch 16 bytes of instruction data into prefetch buffer 30 from either instruction line cache 65 or unified cache 55. BPU 40 is accessed with the prefetch address, and supplies target addresses to prefetcher 35 for predicted changes of flow, allowing prefetcher 35 to shift to a new code stream in a single clock cycle.

Exemplary decode stages ID1 and ID2 decode a variable length x86-based instruction set. Instruction decoder 21 retrieves 16 bytes of instruction data from prefetch buffer 30 each clock cycle. In ID1, the length of two instructions is decoded (one each for the X and Y execution pipelines) to obtain X and Y instruction pointers, a corresponding X and Y bytes-used signal is returned to prefetch buffer 30 which subsequently increments for the next 16 byte transfer. Also in ID1, certain instruction types are determined, such as changes of flow, and immediate or displacement operands are separated. In ID2, the decoding of X and Y instructions is completed, generating entry points for "microROM" and decoding addressing modes and register fields.

The optimum pipeline, X or Y, for executing an instruction is determined during the ID stages, causing the instruction to be issued into that pipeline. In an exemplary embodiment, circuitry is provided for pipeline switching which enables instructions to be switched from ID2X to AC1Y and from ID2Y to AC1X, as certain instructions (e.g., change of flow, floating point, exclusive or other like instructions) may only be issued in one of the two pipelines.

"Exclusive instructions", as the phrase is used herein, include any instructions that may fault within the EX pipeline stage, as well as certain instruction types, such as protected mode segment loads, string, special register access (control, debug, test, etc.), Multiply/Divide, Input/Output, PUSHA/POPA (PUSH all/POP all), task switch and the like. Exclusive instructions may use the resources of both execution pipelines; exclusive instructions are preferably issued alone from the ID stage.

Exemplary address calculation stages AC1 and AC2 calculate addresses for memory references and supply memory operands. During AC1 two 32 bit linear (three operand) addresses are preferably calculated per clock cycle. Data dependencies are checked and resolved using register translation unit 25a and the 31 physical registers in register file 24 are advantageously used to map eight general purpose, programmer-visible logical registers in accordance with x86-based architecture, namely: EAX, EBX, ECX, EDX, EDI, ESI, EBP and ESP. During AC2, register file 24 and unified cache 55 are accessed with the physical address. For cache hits, cache access time for multi-ported, unified cache 55 is the same as that of a register, effectively extending the register set. The physical address is either the linear address, or if address translation is enabled, a translated address generated by ATU 50.

The AC stage preferably includes eight logical, or architectural, registers, representing the x86-based register set. In a preferred embodiment, the logical register corresponding to the stackpointer ("ESP") contains the actual stackpointer (instead of simply a copy thereof) when control of the stackpointer is allocated to AC1. If an instruction requires one or more address calculations, AC1 is operative to wait until the required data of the logical registers are valid before accessing those registers. During AC2, operands are obtained by accessing register file 24 and unified cache 55 with the physical address. The physical address therefore is preferably either the linear address or, if address translation is enabled, a translated address generated by ATU 50.

Exemplary ATU 50 is operative to generate translated addresses, preferably using a translation lookaside buffer ("TLB") or the like, from the linear address using information from page tables in memory and local workspace control registers. Unified cache 55 is virtually indexed and physically tagged to permit, when address translation is enabled, set selection with the untranslated address (available at the end of AC1) and, for each set, tag comparison with the translated address from ATU 50 (available early in AC2). In the illustrated embodiment, segmentation or address translation violation checks are performed in AC2.

Instructions within a given instruction code stream are preferably kept in order until it is determined that out-of-order execution of the same will not cause an exception. This determination may be made during or before AC2, although floating point and certain exclusive instructions may cause exceptions during execution. Instructions are passed from AC2 to EX (floating point instructions are passed to FPU 70). Instructions spend a variable number of clock cycles in EX as many of the same may execute out of order. Integer instructions may cause exceptions in EX and are therefore designated as exclusive and issued alone into both execution pipelines, thereby ensuring that exceptions are handled in order.

Exemplary execution stages EX X and EX Y perform the operations defined by a given instruction using one or more adders, multiplexers, shifters, or other functional units. The EX X execution stage may also include multiplication and division hardware.

Exemplary write back stage ("WB") updates register file 24, condition codes, as well as other parts of an associated processing system with the results of the previously executed instruction. Typically, register file 24 is written in phase 1 ("PH1") of WB and read in phase 2 ("PH2") of AC2.

Additional disclosure of write buffers 75, speculative execution and the microsequencer may be found in U.S. Pat. No. 5,584,009 entitled "System And Method Of Retiring Store Data From A Write Buffer"; U.S. Pat. No. 5,835,967 entitled "Adjusting Prefetch Size Based On Source Of Prefetch Address"; and U.S. Pat. No. 5,644,741 entitled "Processor With Single Clock Decode Architecture Employing Single MicroROM", all of which are commonly assigned to the Assignee of the present invention and are herein incorporated by reference.

Figure 2:
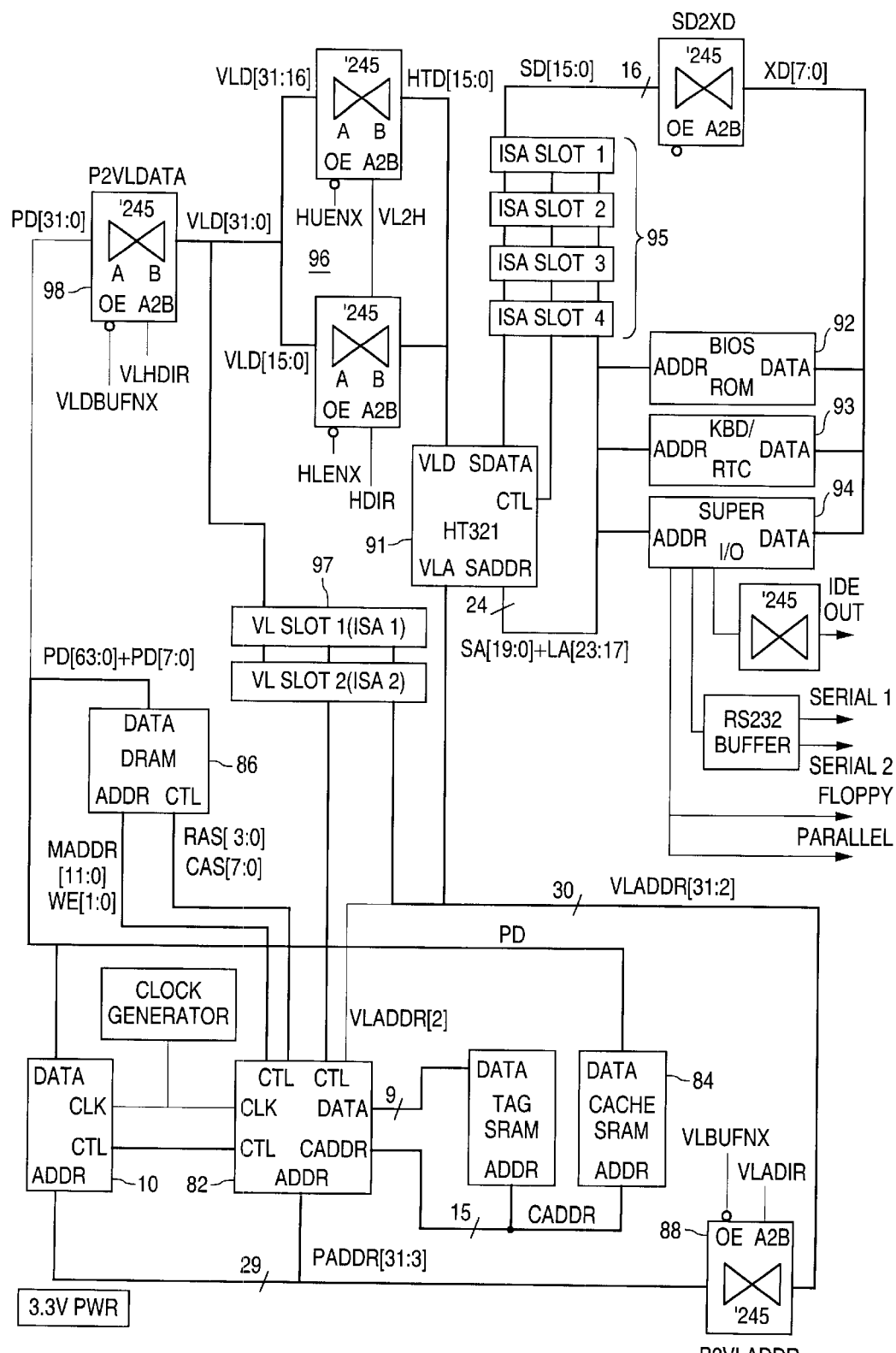
FIG. 2 illustrates a block diagram of an exemplary processor system incorporating the processor of FIGS. 1a and 1b.

Turning to FIG. 2, illustrated is an exemplary processor system design, in the form of a motherboard, that advantageously employs exemplary processor 10 of FIGS. 1a and 1b in cooperation with a single chip memory/bus controller 82. Controller 82 provides an interface between processor 10 and an external memory subsystem controlling data movement over the 64-bit processor data bus. The external memory subsystem includes level two cache 84 and main memory 86. In accordance with the illustrated embodiment, the data path may be external to controller 82 thereby reducing its pin count and cost.

Controller 82 preferably interfaces with ADS, the 32-bit address bus, directly and includes a one bit wide data port (not shown) for reading and writing registers within controller 82. A bidirectional isolation buffer 88 is preferably provided as an address interface between processor 10 and a conventional video local bus ("VL-Bus") and a conventional industry standard architecture ("ISA") bus. Controller 82 provides control for VL-Bus and ISA bus interfaces. A VL/ISA interface chip 91 provides standard interfaces to an exemplary 32-bit VL-Bus and an exemplary 16-bit ISA bus. The ISA bus may interface to a basic input/output system ("BIOS") 92, a keyboard controller 93, and an I/O chip 94, as well as standard ISA slots 95. The interface chip 91 preferably interfaces to the 32-bit VL-bus through a bidirectional 32/16 multiplexer 96 formed by multiple high/low word isolation buffers. The VL-Bus interfaces to standard VL-Bus slots 97 and, through a bidirectional isolation buffer 98, to the low double word of PD.

Figure 3:
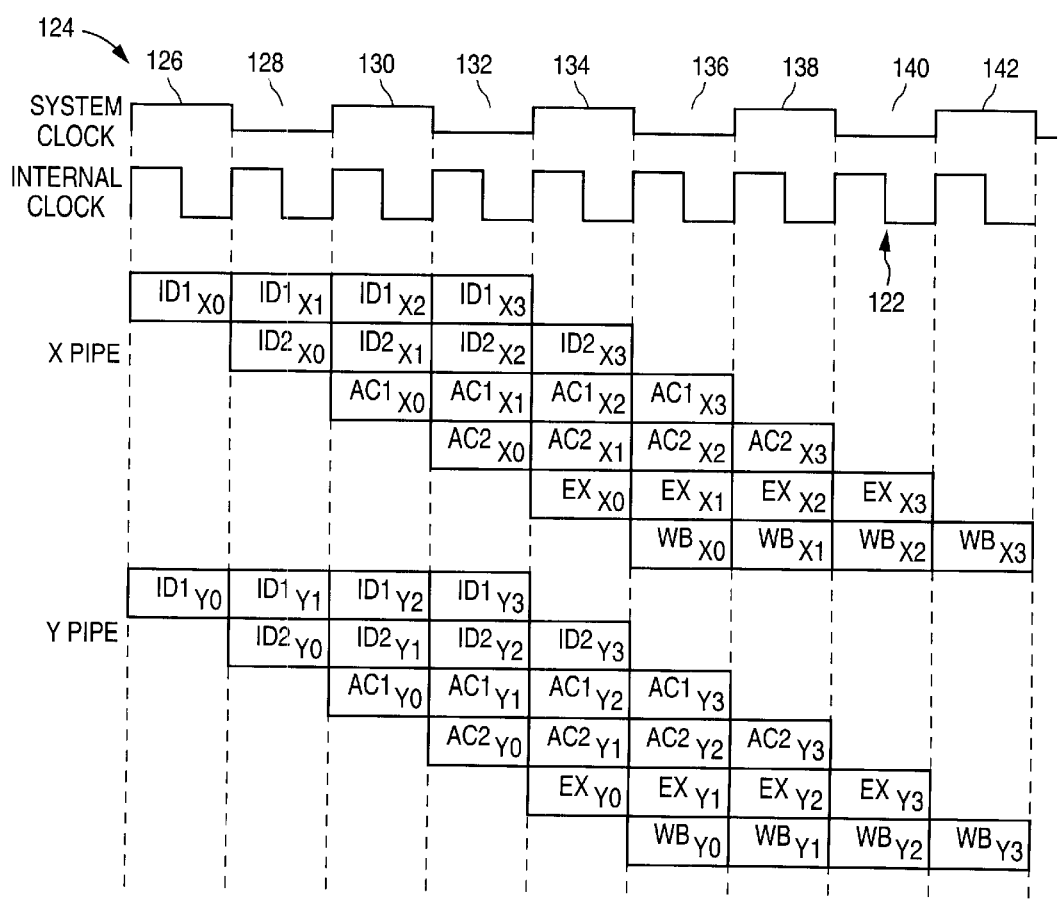
FIG. 3 illustrates an exemplary timing diagram demonstrating the flow of instructions through a pipeline in accordance with the exemplary processor of FIGS. 1a through 2.

Turning to FIG. 3, illustrated is an exemplary timing diagram demonstrating the flow of instructions through a pipeline of processor 10 of FIG. 1a and 2. The timing diagram illustrates the flow of eight instructions through the pipeline, showing overlapping execution of instructions for a two pipeline architecture. Processor 10 preferably uses an internal clock 122 that is a multiple of a system clock 124. In the illustrated embodiment, internal clock 122 operates at twice the frequency of system clock 124.

During a first internal clock cycle 126, the ID1 stage operates respectively on instructions X0 and Y0. During internal clock cycle 128, instructions X0 and Y0 are in the ID2 stage (X0 being in ID2X and Y0 being in ID2Y) and instructions X1 and Y1 are in the ID1 stage. During internal clock cycle 130, instructions X2 and Y2 are in the ID1 stage, instructions X1 and Y1 are in the ID2 stage (X1 being in ID2X and Y1 being in ID2Y) and instructions X0 and Y0 are in the AC1 stage (X0 being in AC1X and Y0 being in AC1Y). During internal clock cycle 132, instructions X3 and Y3 are in the ID1 stage, instructions X2 and Y2 are in the ID2 stage, instructions X1 and Y1 are in the AC1 stage and instructions X0 and Y0 are in the AC2 stage.

The execution portion of each of the foregoing instructions is performed during sequential clock cycles, namely, clock cycles 134 to 140. This is an important aspect a pipelined architecture as the total instructions completed per clock cycle increases without reducing the execution time of individual instructions. Greater instruction throughput is thereby achieved without requiring greater demands on the speed of the hardware.

It should be noted that FIG. 3 illustrates an optimum condition, as no stage requires more than a single clock cycle. In actuality, however, one or more stages may require additional clock cycles for completion, thereby changing instruction flow through the other pipeline stages. Further, instruction flow through one pipeline may depend upon the flow of other instructions in the same or the other pipeline.

Figure 4:
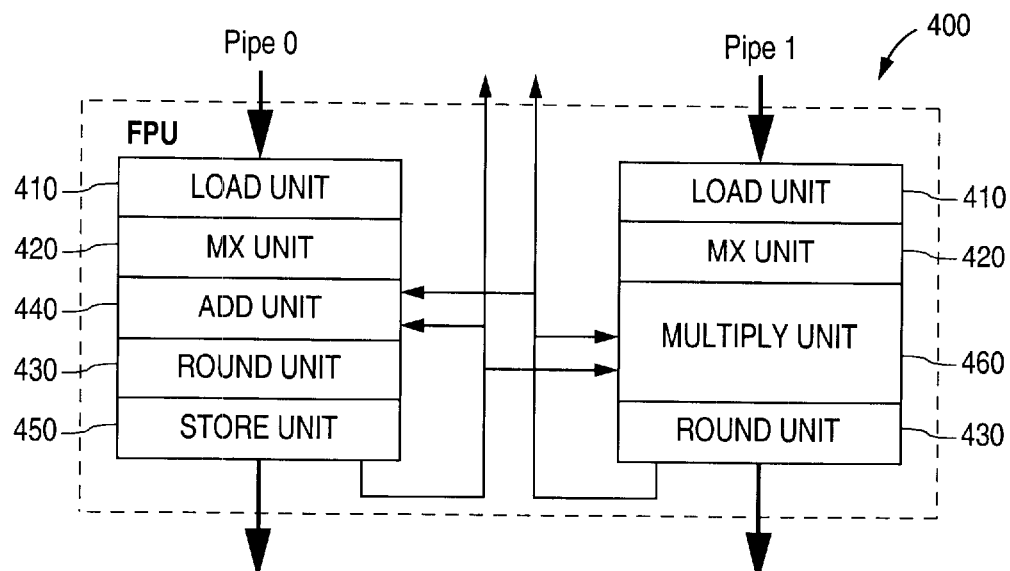
FIG. 4 illustrates an exemplary pipelined floating point unit ("FPU") adaptable to employ the principles of the present invention.

The focus of the present invention is directed to optimizing the operation of FPU 70 in FIG. 1. FIG. 4 illustrates an exemplary pipelined FPU 400 adaptable to employ the principles of the present invention. In the embodiment illustrated, the FPU 400 is designed to be non-symmetric superscalar, which allows for maximum throughput without excessive duplication of execution resources. The exemplary FPU 400 has two pipes, Pipe0 and Pipe1, each having a load unit 410, a multi-media extensions ("MX") unit 420, and a round unit 430. Pipe0 further includes an add unit 440 and a store unit 450, and Pipe1 further includes a multiply unit 460. Although the exemplary architecture of FPU 400 may be adapted to employ the principles of the present invention, the present invention. is not limited to a specific FPU architecture. From the description hereinafter, those skilled in the art will readily conceive of the means and advantages of employing the system and method disclosed herein to provide a system and method for rounding denormalized numbers and processor employing the same; the rounding unit 430 is preferably of a modular design that allows the same unit to be employed, without modification, in combination with the add unit 440, multiply unit 460, and store unit 450.

Before describing in detail the modularized rounding unit of the present invention, a brief description of the formats for numbers in floating point notation, the rounding modes typically employed, and other pertinent information is discussed. First, an IEEE floating point number consists of the following three fields:
 1. Sign bit s.
 2. q binary digit biased exponent E=e+bias.
 3. p binary digit fraction f.

The IEEE 754 standard specifies four formats, namely: single, single extended, double and double extended; in each format there are five different types of numbers, as shown in TABLE 1.

TABLE 1

| | |
|---|---|
| Normalized ($0 < e < 2^q - 1$) | $(-1)^s \times 2^{e-bias} \times 1.f$ |
| Denormalized ($e = 0, f \neq 0$) | $(-1)^s \times 2^{1-bias} \times 0.f$ |
| Zero ($e = 0, f = 0$) | $(-1)^s \times 0$ |
| NaN ($e = 2^q - 1, f \neq 0$) | Not a number |
| Infinity ($e = 2^q - 1, f = 0$) | $(-1)^s \times \infty$ |

Second, the rounding modes include: round to positive infinity, or round up ("RU"); round to negative infinity, or round down ("RD"); round to nearest even ("RNE"); and round to zero ("RTZ")

Figure 5:
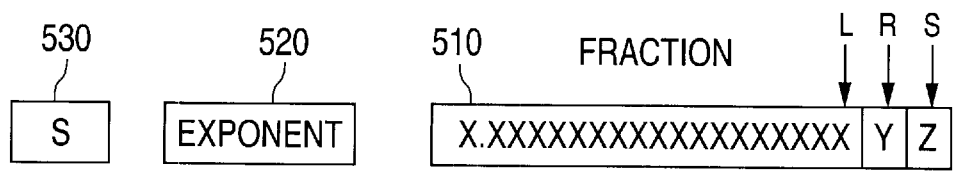
FIG. 5 illustrates the conventional format for a number in floating point notation.

FIG. 5 illustrates the conventional format for a number in floating point notation. The number includes a floating point portion 510, or mantissa, an exponent portion "exp" 520, a sign bit "s" 530. In addition, "LRS" bits are associated with the number; those skilled in the art are familiar with conventionally-used "LRS" bits. For a floating point fraction, or mantissa, 1.f, "L" is the least significant bit ("LSB"), "R" is the "round" bit to the right of the LSB, and "S" is the "sticky" bit to the right of the R bit. Those skilled in the art will also recognize that the rounding modes can be defined as shown in TABLE 2.

TABLE 2

| | |
|---|---|
| RU | (s = 0) & (R\|S) |
| RD | (s = 1) & (R\|S) |
| RNE | R & (L\|S) |
| RTZ | ∅ |

Figure 6:
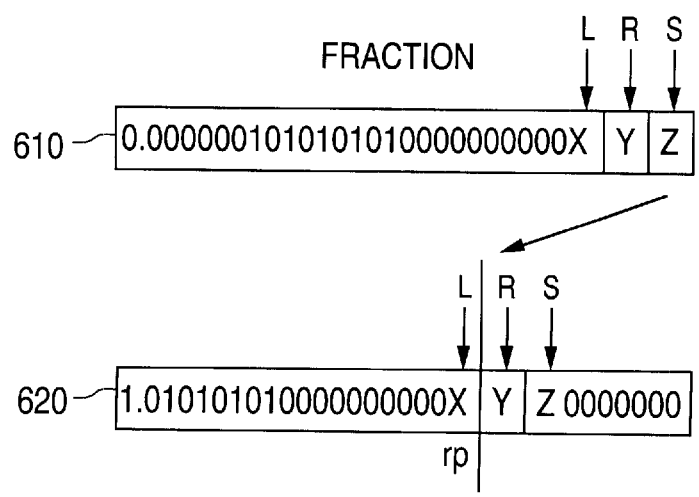
FIG. 6 illustrates a problem associated with the normalization of denormal numbers.

As shown in TABLE 1, for a denormal number, e=0, f≠0. For various operations, such as multiplication and division, operations on denormal numbers is complicated by the fact that the exponent powers of the operands do not match up, i.e., are not equal, making the addition/subtraction of the exponents difficult. In order to simplify these operations, the denormalized numbers are preferably put in a normalized form, internal to the FPU, with a larger exponent. The normalization process of denormalized numbers, however, creates another problem; it results in the shifting of the LRS bits, thereby making the rounding process more difficult, as illustrated in FIG. 6. FIG. 6 illustrates a problem associated with the normalization of denormal numbers. The mantissa 610 is a denormal number. When the denormal number is normalized, yielding the mantissa 620, the LRS bits are also shifted; thus, the normalized form of a denormal number has the rounding point ("rp") shifted left by the normalization count. To correctly deal with this problem, a rounding unit must be able to determine by how much the LRS bits are shifted due to normalization.

Figure 7:
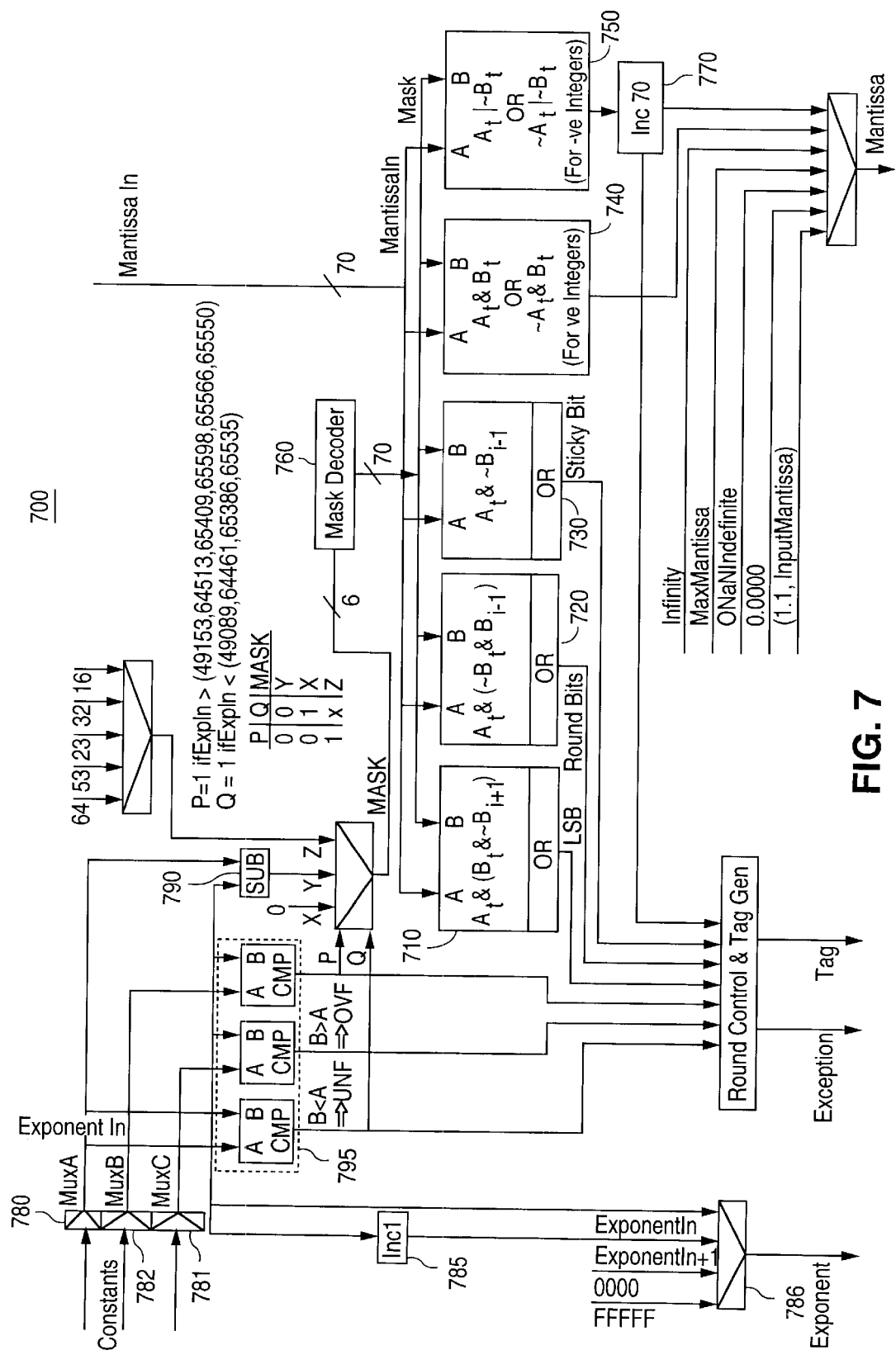
FIG. 7 illustrates an exemplary rounding unit in accordance with the principles of the present invention.

According to the principles of the present invention, the rounding unit works by creating a mask which includes the bits of the result which are valid. The mask is then used to mask off bits of the mantissa which should be set to zero and extract mantissa bits which determine how the rounding operation should be performed. FIG. 7 illustrates an exemplary rounding unit 700 in accordance with the principles of the present invention. The operation of the exemplary rounding unit 700 can be understood in combination with FIG. 8, which illustrates how a transcendental precision mantissa, with 70 bits of precision, is rounded to 23 bits for a single precision number.

Figure 9:
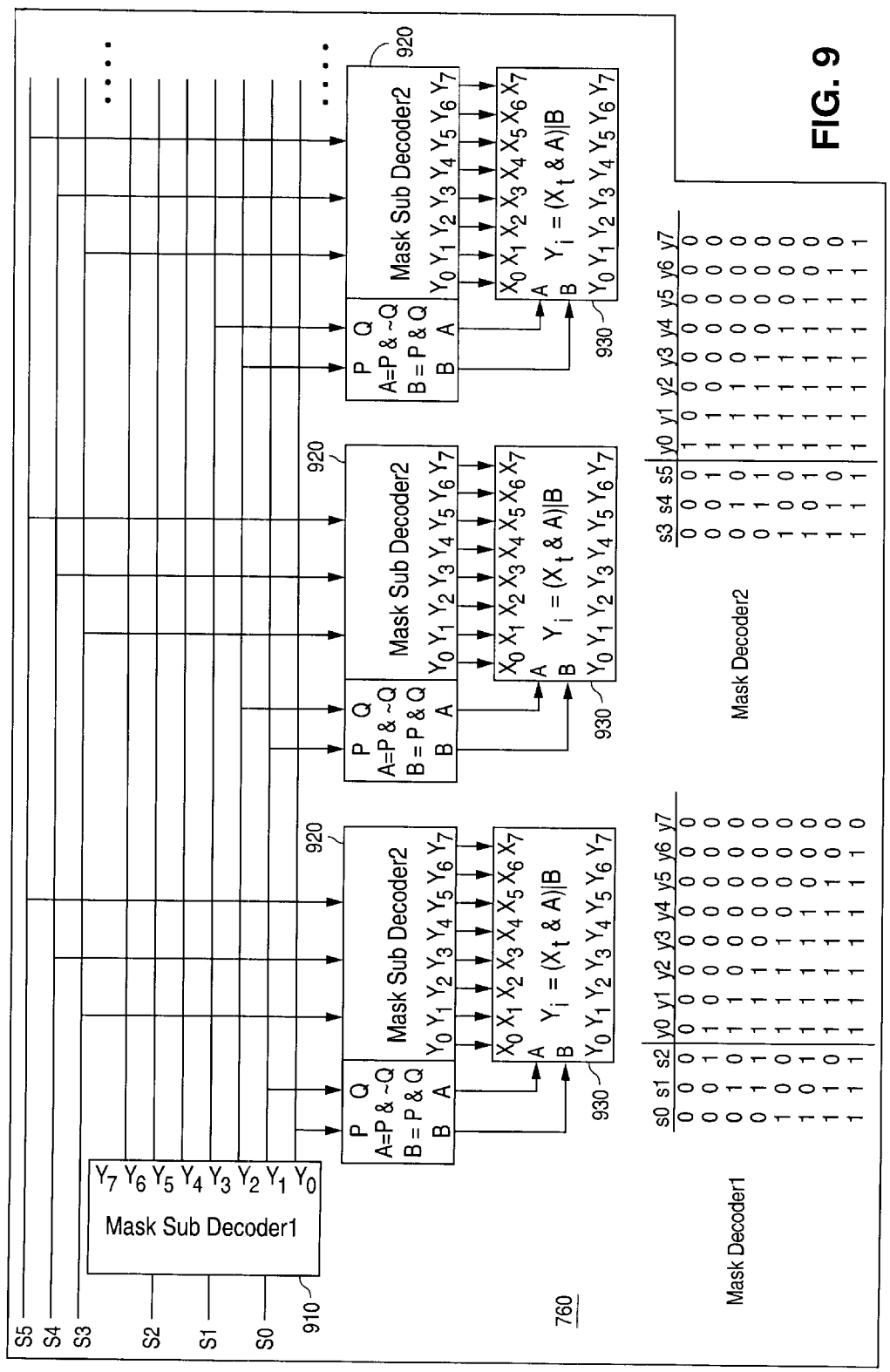
FIG. 9 illustrates an exemplary mask decoder, employed by the exemplary rounding unit of FIG. 7, according to the principles of the present invention.

In a first step, the input operand ("Mantissa In"), which is to be rounded to 23 bits, is received in 70 bit precision by the "A" inputs of combinatorial logic circuits 710, 720, 730, 740 and 750. In a step 2, a single precision mask, which is generated from a mask count of 23 by mask decoder 760, is received by the "B" inputs of combinatorial logic circuits 710, 720, 730, 740 and 750; FIG. 9, discussed hereinafter, describes the operation of mask decoder 760. In a step 3, the single precision mask is complemented (denoted by the "~" symbol in FIG. 7, by combinatorial logic circuits 710, 720, 730 and 750.

In a step 4, the mask is logically "AND"ed with the input operand, which is simply the input operand truncated to 23 bits, using combinatorial logic circuit 740. In a step 5, the complement of the mask and the input operand are logically "OR"ed by combinatorial logic circuit 750; this function is performed so that a number can be generated which, when rounded in the LSB, will result in generation of a carry at the appropriate precision LSB and will aid in generating the rounded-up version of the input operand. In a step 6, the intermediate result of step 5 is incremented by 1, using incrementer 770, to yield the rounded up result.

The LRS bits are generated by combinatorial logic circuits 710, 720 and 730. In a step 7, the logical AND of the input operand and the mask, shifted by one to the right and complemented, is performed by combinatorial logic circuit 730; the reduction, or bit-wise "OR," of this value is the sticky bit S.

In a step 8, the logical AND of complemented mask bits and the mask shifted right by one is performed by combinatorial logic circuit 720, which places a one in the round bit position; those skilled in the art will note that the input to the rounder is an already normalized number, so there is no need to generate two round bits. In a step 9, the result of step 8 is ANDed with the input operand by combinatorial logic circuit 720; the reduction OR of this value will be the round bit (R) that is used during the actual rounding operation.

In a step 10, the logical AND of the mask bits and the complement of the mask bits shifted left by one is performed by combinatorial logic circuit 710 to yield a mask for the LSB of the operand. In a step 11, the mask generated in step 10 is logically ANDed with the input operand; the reduction OR of this value will be the least significant bit (LSB) used for rounding.

Those skilled in the art will recognize that although the foregoing operations have been described as distinct "steps", the functions performed by combinatorial logic circuits 710, 720, 730, 740 and 750 may be performed simultaneously.

A multiplexer ("MuxA") 780 and a subtracter 790 are primarily responsible for generating the mask count which determines the number of bits the mantissa should be rounded to. The expression for the mask count of each precision format is provided in TABLE 3.

TABLE 3

| PRECISION | EXPRESSION |
| --- | --- |
| Extended | MaskCount = Min(64, Max(ExpIn-65535 + 16382 + 64,0)) = Min(64, Max(ExpIn-49089,0)) |
| | Max Extended Precision Exp in Internal Precision = 81918 |
| | Min Extended Precision Exp in Internal Precision = 49153 |
| Double | MaskCount = Min(52, Max(ExpIn-65535 + 1022 + 52,0)) = Min(52, Max (ExpIn-64461,0)) |
| | Max Double Precision Exp in Internal Precision = 66558 |
| | Min Extended Precision Exp in Internal Precision = 64513 |
| Single | MaskCount = Min(23, Max(ExpIn-65535 + 126 + 23, 0)) = Min (23, Max (ExpIn-65386) |
| | Max Single Precision Exp in Internal Precision = 65662 |
| | Min Single Precision Exp in Internal Precision = 65409 |
| 64 bit Integer | MaskCount = Min(64, Max(ExpIn-65535, 0)) |
| | Max 64 bit Integer Exp in Internal Precision = 65535 + 63 = 65598 |
| | Min 64 bit Integer Exp in Internal Precision = 65535 |
| 32 bit Integer | MaskCount = Min(32, Max(ExpIn-65535, 0)) |
| | Max 32 bit Integer Exp in Internal Precision = 65535 + 15 = 65566 |
| | Min 32 bit Integer Exp in Internal Precision = 65535 |
| 16 bit Integer | MaskCount = Min(16, Max(ExpIn-65535, 0)) |
| | Max 16 bit Integer Exp in Internal Precision = 65535 + 15 = 65550 |
| | Min 16 bit Integer Exp in Internal Precision = 65535 |

A series of comparators 795 compare the input operands exponent ("Exponent In") with the minimum and maximum ranges of the result's exponent received from multiplexers 781 and 782 ("MUXC" and "MUXB"). If the exponent is greater than or less than the resulting precision's range, the comparators will detect the condition and will set the output exponent and mantissa to the proper value, e.g., infinity, maximum value in range, zero, etc. If the exponent is within range, the result after rounding may have a carry-out which would cause the exponent to need to be incremented by one; an incrementer 785 is used to increment the input exponent so that once the proper value of the mantissa is determined the exponent can be selected via a multiplexer 786.

The mask decoder 760 generates the bit mask which consists of a group of all zeros and then a group of all ones. as illustrated in the example of FIG. 8. FIG. 9 illustrates an exemplary mask decoder 760, according to the principles of the present invention; the mask decoder 760 has a two-level structure. The six input bits, S0 through 5, are broken into two groups of three bits. The least significant three bits (or which ever are earlier) are decoded by a mask sub-decoder 910, which produces an eight bit sub-mask. The most significant three bits of the input are broadcast to eight separate sub-decoders, generally designated 920 (three shown), which each produce a sub-mask. After the first level decoder has evaluated and has broadcast its result, a single gate will produce an enable mask or enable all ones for the second level decoder. The output of the second level decoder will be combinationally gated with these two block decodes. The critical path is through the level 1 sub-decoder through the block decode gate and through a final output gate, generally designated 930.

Once the number has been rounded to the appropriate precision for storing, the final store conversion must be done. For single, double and extended precision numbers, this only requires shifting the mantissa right to create a denormal with the proper mantissa alignment, and re-biasing the exponent for the memory format. The denormal shift amount is computed by taking the minimum normalized exponent for each format and subtracting from it the input exponent; preferably, 70-MantissaSize is added to this so that all output mantissas are aligned to the same LSB which makes writing them to an operand queue easier. If the result of the subtraction is negative, then no shift needs to be done and the un-shifted mantissa is used.

Figure 10:
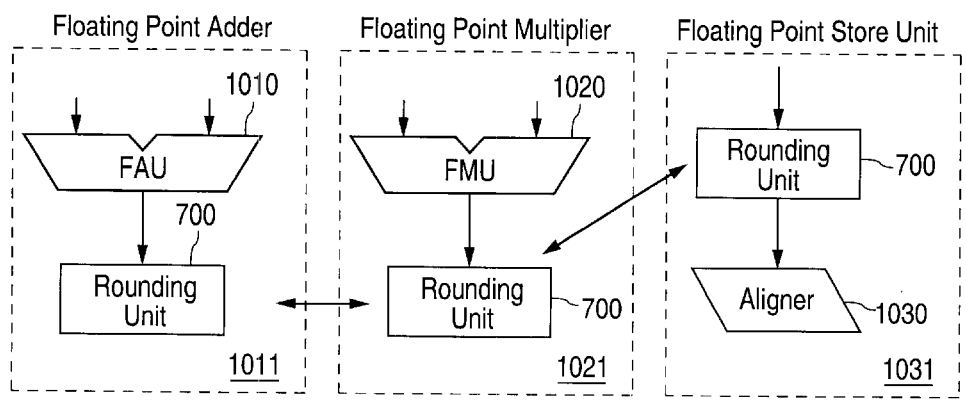
FIG. 10 illustrates the exemplary rounding unit of FIG. 7 in combination with a FAU in a floating point adder 1011, in combination with a FMU in a floating point multiplier, and in combination with an aligner in a store unit.

From the foregoing, those skilled in the art will recognize that the design of exemplary rounding unit 700 is "modularized"; i.e., the inputs and outputs are such that the unit can be employed with an FAU, FMU, or a store unit. FIG. 10 illustrates the exemplary rounding unit 700 in combination with a FAU 1010 in a floating point adder 1011, in combination with a FMU 1020 in a floating point multiplier 1021, and in combination with an aligner 1030 in a store unit 1031. Those skilled in the art will also appreciate the advantages of employing the modularized rounding unit 700 in combination with other circuits; in particular, the logic circuitry described hereinabove for generating LRS bits may be employed to advantage in other rounding unit designs in various FPU architectures; the scope of the claims recited hereinafter intended to include all such implementations.

From the above, it is apparent that the present invention provides a system and method for rounding denormalized numbers and a processor employing the same. The system or method can be embodied in a modular circuit that is suitably operative in combination with a floating point adder, a floating point multiplier, and a floating point store unit. Although the present invention and its advantages have been described in detail, those skilled in the art should understand that they can make various changes, substitutions and alterations herein without departing from the spirit and scope of the invention in its broadest form.

What is claimed is:

1. For use in a processor having a floating point unit (FPU) capable of managing denormalized numbers in floating point notation, logic circuitry for generating least significant (L), round (R) and sticky (S) bits for a denormalized number, comprising:
    a bit mask decoder that produces a bit mask that is a function of a precision of the denormalized number and an extent to which the denormalized number is denormal; and
    combinatorial logic, coupled to the bit mask decoder, that performs logical operations with respect to a fraction portion of the denormalized number, the bit mask and at least one shifted version of the bit mask to yield the L, R and S bits.

2. The logic circuitry as recited in claim 1 wherein the combinatorial logic generates the L bit by:
    initially bitwise ANDing the bit mask and an inverted, left-shifted version of the bit mask to yield a first intermediate bit pattern;
    next bitwise ANDing the fraction portion and the first intermediate bit pattern to yield a second intermediate bit pattern; and
    next ORing bits in the second intermediate bit pattern to yield the L bit.

3. The logic circuitry as recited in claim 1 wherein the combinatorial logic generates the R bit by:
    initially bitwise ANDing an inverted version of the bit mask and a right-shifted version of the bit mask to yield a first intermediate bit pattern;
    next bitwise ANDing the fraction portion and the first intermediate bit pattern to yield a second intermediate bit pattern; and
    next ORing bits in the second intermediate bit pattern to yield the R bit.

4. The logic circuitry as recited in claim 1 wherein the combinatorial logic generates the S bit by:
    initially bitwise ANDing the fraction portion and an inverted, right-shifted version of the bit mask to yield an intermediate bit pattern; and
    next ORing bits in the intermediate bit pattern to yield the S bit.

5. For use in a processor having a floating point unit (FPU) capable of managing denormalized numbers in floating point notation, logic circuitry for generating least significant (L), round (R) and sticky (S) bits for a denormalized number, comprising:
    decoding means for producing a bit mask that is a function of a precision of the denormalized number and an extent to which the denormalized number is denormal; and
    combinatorial means, coupled to the decoding means, that performs logical operations with respect to a fraction portion of the denormalized number, the bit mask and at least one shifted version of the bit mask to yield the L, R and S bits.

6. The logic circuitry as recited in claim 5 wherein the combinatorial means generates the L bit by:
    initially bitwise ANDing the bit mask and an inverted, left-shifted version of the bit mask to yield a first intermediate bit pattern;
    next bitwise ANDing the fraction portion and the first intermediate bit pattern to yield a second intermediate bit pattern; and
    next ORing bits in the second intermediate bit pattern to yield the L bit.

7. The logic circuitry as recited in claim 5 wherein the combinatorial means generates the R bit by:
    initially bitwise ANDing an inverted version of the bit mask and a right-shifted version of the bit mask to yield a first intermediate bit pattern;
    next bitwise ANDing the fraction portion and the first intermediate bit pattern to yield a second intermediate bit pattern; and
    next ORing bits in the second intermediate bit pattern to yield the R bit.

8. The logic circuitry as recited in claim 5 wherein the combinatorial means generates the S bit by:
    initially bitwise ANDing the fraction portion and an inverted, right-shifted version of the bit mask to yield an intermediate bit pattern; and
    next ORing bits in the intermediate bit pattern to yield the S bit.

9. For use in a processor having a floating point unit (FPU) capable of managing denormalized numbers in floating point notation, a method of generating least significant (L), round (R) and sticky (S) bits for a denormalized number, comprising the steps of:
    producing a bit mask that is a function of a precision of the denormalized number and an extent to which the denormalized number is denormal; and
    performing logical operations with respect to a fraction portion of the denormalized number, the bit mask and at least one shifted version of the bit mask to yield the L, R and S bits.

10. The method as recited in claim 9 wherein the step of performing comprises the steps of:
    initially bitwise ANDing the bit mask and an inverted, left-shifted version of the bit mask to yield a first intermediate bit pattern;

next bitwise ANDing the fraction portion and the first intermediate bit pattern to yield a second intermediate bit pattern; and next ORing bits in the second intermediate bit pattern to yield the L bit.

11. The method as recited in claim 9 the step of performing comprises the steps of:

initially bitwise ANDing an inverted version of the bit mask and a right-shifted version of the bit mask to yield a first intermediate bit pattern;

next bitwise ANDing the fraction portion and the first intermediate bit pattern to yield a second intermediate bit pattern; and next ORing bits in the second intermediate bit pattern to yield the R bit.

12. The method as recited in claim 9 the step of performing comprises the steps of:

initially bitwise ANDing the fraction portion and an inverted, right-shifted version of the bit mask to yield an intermediate bit pattern; and next ORing bits in the intermediate bit pattern to yield the S bit.

13. A computer system, comprising:

(a) a processor having an integer execution core containing at least one execution pipeline for executing integer instructions and a floating point execution core containing at least one execution pipeline for executing floating point instructions and capable of managing denormalized numbers in floating point notation, the processor capable of addressing segments of system memory coupled thereto;

(b) system memory for storing integer and floating point instructions including instructions for accessing the system memory;

(c) the processor including instruction fetch logic that fetches integer and floating point instructions from the system memory; and (d) the processor further including logic circuitry for generating least significant (L), round (R) and sticky (S) bits for a denormalized number, including:

(i) a bit mask decoder that produces a bit mask that is a function of a precision of the denormalized number and an extent to which the denormalized number is denormal, and (ii) combinatorial logic, coupled to the bit mask decoder, that performs logical operations with respect to a fraction portion of the denormalized number, the bit mask and at least one shifted version of the bit mask to yield the L, R and S bits.

14. The computer system as recited in claim 13 wherein the combinatorial logic generates the L bit by:

initially bitwise ANDing the bit mask and an inverted, left-shifted version of the bit mask to yield a first intermediate bit pattern;

next bitwise ANDing the fraction portion and the first intermediate bit pattern to yield a second intermediate bit pattern; and next ORing bits in the second intermediate bit pattern to yield the L bit.

15. The computer system as recited in claim 13 wherein the combinatorial logic generates the R bit by:

initially bitwise ANDing an inverted version of the bit mask and a right-shifted version of the bit mask to yield a first intermediate bit pattern;

next bitwise ANDing the fraction portion and the first intermediate bit pattern to yield a second intermediate bit pattern; and next ORing bits in the second intermediate bit pattern to yield the R bit.

16. The computer system as recited in claim 13 wherein the combinatorial logic generates the S bit by:

initially bitwise ANDing the fraction portion and an inverted, right-shifted version of the bit mask to yield an intermediate bit pattern; and next ORing bits in the intermediate bit pattern to yield the S bit.

17. A method of operating a computer system, comprising the steps of:

(a) applying power to a processor having an integer execution core containing at least one execution pipeline for executing integer instructions and a floating point execution core containing at least one execution pipeline for executing floating point instructions and capable of managing denormalized numbers in floating point notation, the processor capable of addressing segments of system memory coupled thereto;

(b) storing integer and floating point instructions in a system memory, the instructions including instructions for accessing the system memory;

(c) fetching integer and floating point instructions from the system memory; and (d) executing instructions in the processor, the processor further including logic circuitry for generating least significant (L), round (R) and sticky (S) bits for a denormalized number, including:

(i) a bit mask decoder that produces a bit mask that is a function of a precision of the denormalized number and an extent to which the denormalized number is denormal, and (ii) combinatorial logic, coupled to the bit mask decoder, that performs logical operations with respect to a fraction portion of the denormalized number, the bit mask and at least one shifted version of the bit mask to yield the L, R and S bits.

18. The method as recited in claim 17 wherein the combinatorial logic generates the L bit by:

initially bitwise ANDing the bit mask and an inverted, left-shifted version of the bit mask to yield a first intermediate bit pattern;

next bitwise ANDing the fraction portion and the first intermediate bit pattern to yield a second intermediate bit pattern; and next ORing bits in the second intermediate bit pattern to yield the L bit.

19. The method as recited in claim 17 wherein the combinatorial logic generates the R bit by:

initially bitwise ANDing an inverted version of the bit mask and a right-shifted version of the bit mask to yield a first intermediate bit pattern;

next bitwise ANDing the fraction portion and the first intermediate bit pattern to yield a second intermediate bit pattern; and next ORing bits in the second intermediate bit pattern to yield the R bit.

20. The method as recited in claim 17 wherein the combinatorial logic generates the S bit by:

initially bitwise ANDing the fraction portion and an inverted, right-shifted version of the bit mask to yield an intermediate bit pattern; and next ORing bits in the intermediate bit pattern to yield the S bit.

* * * * *

UNITED STATES PATENT AND TRADEMARK OFFICE
CERTIFICATE OF CORRECTION

PATENT NO. : 6,490,606 B1
DATED : December 3, 2002
INVENTOR(S) : Green et al.

It is certified that error appears in the above-identified patent and that said Letters Patent is hereby corrected as shown below:

Column 12,
Line 53, delete "5" and insert -- S5 --.

Signed and Sealed this

Fifteenth Day of November, 2005

JON W. DUDAS
*Director of the United States Patent and Trademark Office*